L. E. WATERMAN.
SLED CULTIVATOR.
APPLICATION FILED MAR. 17, 1910.
991,120.
Patented May 2, 1911.
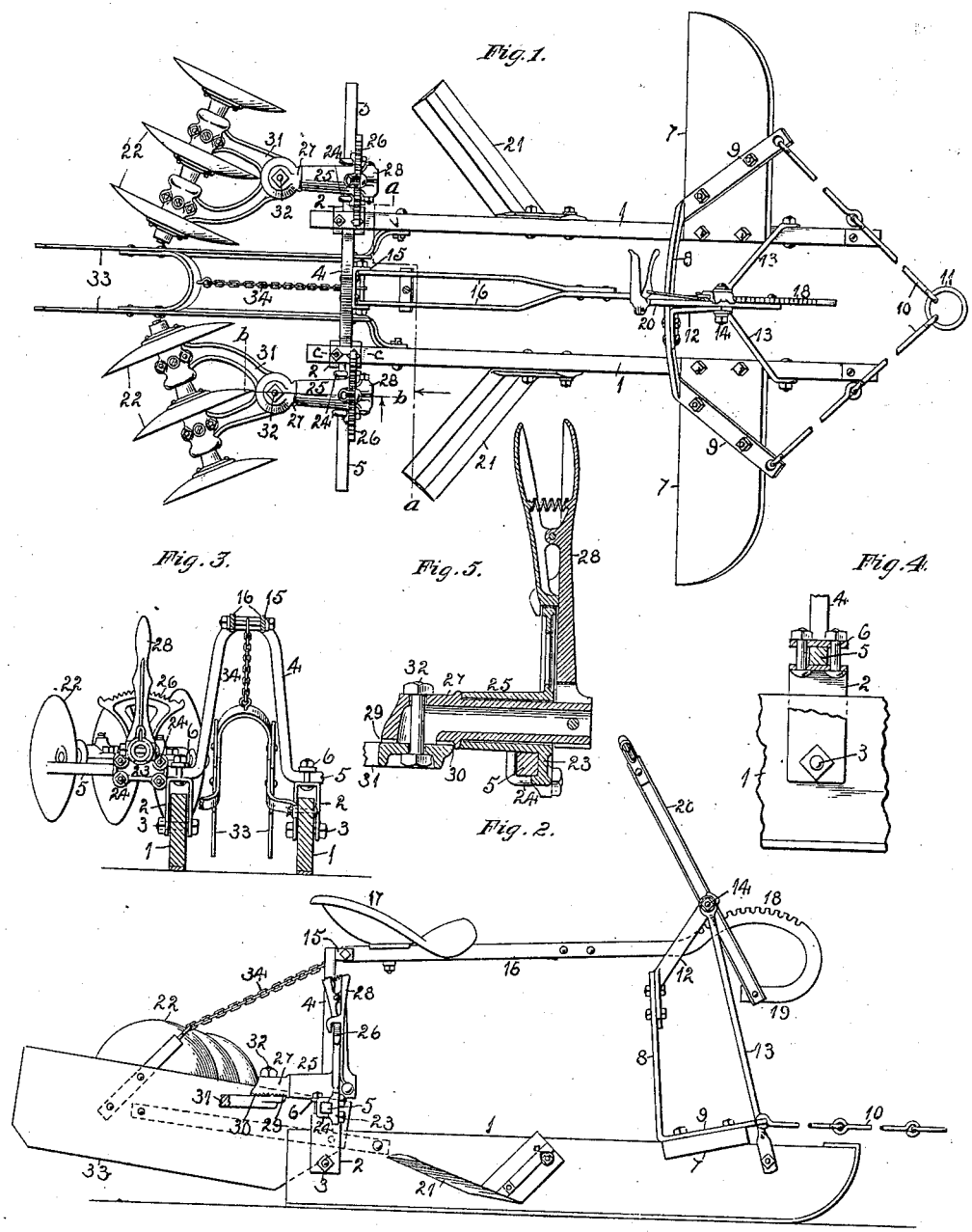

UNITED STATES PATENT OFFICE.

LEWIS E. WATERMAN, OF ROCKFORD, ILLINOIS, ASSIGNOR TO EMERSON-BRANTINGHAM COMPANY, OF ROCKFORD, ILLINOIS, A CORPORATION OF ILLINOIS.

SLED-CULTIVATOR.

991,120.

Specification of Letters Patent.

Patented May 2, 1911.

Application filed March 17, 1910. Serial No. 550,053.

*To all whom it may concern:*

Be it known that I, LEWIS E. WATERMAN, a citizen of the United States, residing at Rockford, in the county of Winnebago and State of Illinois, have invented certain new and useful Improvements in Sled-Cultivators, of which the following is a specification.

The object of this invention is to construct a sled cultivator in which the disk cultivating devices are capable of adjustment diagonally across the line of draft, and also capable of an oscillatory movement on a horizontal axis.

In the accompanying drawings, Figure 1 is a plan view of my improved sled cultivator. Fig. 2 is a side elevation. Fig. 3 is a section on dotted line *a a* Fig. 1. Fig. 4 is a section on dotted line *c c* Fig. 1. Fig. 5 is a section on dotted line *b b* Fig. 1.

To the rear end of each of the runners 1 is pivotally connected a yoke 2 by the bolt 3. A bail 4 has laterally extending square sections 5, and clips 6 connect these sections to the yokes 2. The forward ends of the runners 1 have laterally extending wings 7 bolted thereto. A yoke 8 has feet 9 bolted to the upper faces of these wings. Draft links 10 are connected to the feet 9, also to a central ring 11. A bracket 12 has one end bolted to the upper portion of the yoke 8. Two brace rods 13 have their lower ends bolted to the front ends of the runners and their upper ends are connected to the upper end of the bracket 12 by the bolt 14.

To the front face of the yoke 4 is secured a bracket 15, to which are pivoted bars 16 forming a support for a seat 17. The forward portion of the united bars 16 is in the form of a toothed segment 18 having a hooked end 19. A hand lever 20 is pivotally supported by the bolt 14, and has its lower end pivotally connected to the end of the hook 19. A thumb lever and dog are supported by the lever 20 and the dog engages the teeth of the segment 18. By means of the hand lever 20 the yoke 4 will be rocked back and forth and held in its adjusted position. To the outer faces of the runners are secured knives 21 which extend rearwardly and upwardly from their connection with the runners 1.

To each of the sections 5 of the yoke 4 is secured a series of disks 22 by a bracket 23 clamped to the front face of the extension by the U bolts 24. This bracket has a tubular section 25, and a toothed segment 26. An arm 27 is located in the tubular section and to one end thereof is pinned a hand lever 28 provided with a thumb-latch adapted to engage the teeth of the segment 26, thereby locking the arm 27 to the extension 5. By means of the U bolts 24 the bracket 23 can be adjusted along the section 5. The rear end of the arm 27 is formed with serrations 29 which mesh with serrations 30 formed in the forward end of the yoke 31, and a bolt 32 clamps these serrated faces together, and also serves as a pivot for the yoke. The arms of this yoke support the disks 22, in a manner to permit the disks to rotate.

To the inner faces of the runners near their rear ends are pivoted shields 33 which are located between the two disk sections. A chain 34 connects the shield with the yoke 4. As the yoke 4 is rocked, the shield will be raised or lowered, and the disks will also be raised or lowered.

The yoke 31 carrying the disk sections is adjustable, the bolt 32 acting as a pivotal center. This adjustment admits the disks to take more or less land.

As the cultivator is drawn over the land, the knives 21 will sever the weeds, and the disks will turn them under.

I claim as my invention.

1. In a sled cultivator, the combination with spaced runners, of a transverse bar pivotally mounted thereon, earth-agitating devices connected to the bar, a lever fulcrumed between its ends on the runners, a link connected to the bar and to the lower end of the lever, said link having an offset rack formed directly thereon and movable adjacent to the fulcrum of the lever, and a dog carried by the lever and engaging the rack.

2. A sled cultivator, comprising two runners, an arched yoke pivoted to the runners, and having lateral extensions, earth agitating devices connected to each extension, a stationary arched yoke connected to the runners, a hand lever supported by the stationary yoke, a bar connected at one end to the pivoted yoke, its other end turned down and formed with teeth with which the hand lever engages, the hand lever connected to the down turned end of this bar, and a seat supported by the bar.

3. In a sled cultivator, the combination with supporting means, of earth agitating means pivotally mounted thereon, a lever fulcrumed on the supporting means, a link pivoted at its rear end to the earth agitating means and having its front portion downwardly and rearwardly curved, said curved portion extending transversely to the lever and in advance of the same and the rearwardly extending end being pivoted to the lever at one side of the fulcrum, said curved portion being formed with a rack and moving at a substantially fixed distance from the fulcrum on the movement of the lever, and a dog mounted on the lever and coacting with the rack.

In testimony whereof I have hereunto set my hand in presence of two subscribing witnesses.

LEWIS E. WATERMAN.

Witnesses:
A. O. BEHEL,
E. D. E. N. BEHEL.

Copies of this patent may be obtained for five cents each, by addressing the "Commissioner of Patents, Washington, D. C."